US010078697B2

(12) United States Patent
Popov

(10) Patent No.: US 10,078,697 B2
(45) Date of Patent: Sep. 18, 2018

(54) COMPUTER-IMPLEMENTED METHOD OF AND SYSTEM FOR SEARCHING AN INVERTED INDEX HAVING A PLURALITY OF POSTING LISTS

(71) Applicant: YANDEX EUROPE AG, Lucerne (CH)

(72) Inventor: Petr Sergeevich Popov, Moscow (RU)

(73) Assignee: Yandex Europe AG, Lucerne (CH)

( * ) Notice: Subject to any disclaimer, the term of this patent is extended or adjusted under 35 U.S.C. 154(b) by 341 days.

(21) Appl. No.: 14/423,554

(22) PCT Filed: Feb. 25, 2013

(86) PCT No.: PCT/US2013/027562
§ 371 (c)(1),
(2) Date: Feb. 24, 2015

(87) PCT Pub. No.: WO2014/031151
PCT Pub. Date: Feb. 27, 2014

(65) Prior Publication Data
US 2015/0186519 A1    Jul. 2, 2015

(30) Foreign Application Priority Data
Aug. 24, 2012  (RU) ................ PCT/RU2012/000697

(51) Int. Cl.
G06F 17/30     (2006.01)
G06F 9/48      (2006.01)

(52) U.S. Cl.
CPC ......... G06F 17/30864 (2013.01); G06F 9/48 (2013.01); G06F 17/30622 (2013.01)

(58) Field of Classification Search
CPC .................................. G06F 17/30864
(Continued)

(56) References Cited

U.S. PATENT DOCUMENTS 7,702,614 B1 *  4/2010  Shah ................. G06F 17/30622
                                              707/739
9,015,153 B1 *  4/2015  Zhang ..................... G06F 17/28
                                              707/723
(Continued)

FOREIGN PATENT DOCUMENTS

EP        2192503 A1    6/2010

OTHER PUBLICATIONS

Supplementary International Search Report, PCT/US2013/027562, dated Dec. 11, 2014, NOLL, Joachim.
(Continued)

Primary Examiner — Hosain Alam
Assistant Examiner — Saba Ahmed
(74) Attorney, Agent, or Firm — BCF LLP

(57) ABSTRACT

Computer-implemented method of and system for searching an inverted index having a plurality of posting lists, comprising: Receiving a search query including a plurality of search terms to be searched. Multithreadedly searching a plurality of complementary sets of corresponding interspaced segments of each of the plurality of posting lists corresponding to the plurality of search terms, each set being searched via a separate thread to yield per-thread search results. Aggregating the per-thread search results to yield aggregated search results. Transmitting at least a portion of the aggregated search results.

23 Claims, 2 Drawing Sheets

(58) Field of Classification Search
USPC .......................................................... 707/723
See application file for complete search history.

(56) References Cited

U.S. PATENT DOCUMENTS

| | | | |
|---|---|---|---|
| 2003/0014405 A1 | 1/2003 | Shapiro et al. | |
| 2008/0033920 A1* | 2/2008 | Colclasure | G06F 17/30442 |
| 2008/0071542 A1 | 3/2008 | Yu | |
| 2009/0164437 A1 | 6/2009 | Torbjornsen | |
| 2009/0228528 A1* | 9/2009 | Ercegovac | G06F 17/30622 |
| 2010/0042603 A1 | 2/2010 | Smyros et al. | |
| 2010/0169351 A1* | 7/2010 | Kulkarni | G06F 17/30879 |
| | | | 707/759 |
| 2011/0040762 A1* | 2/2011 | Flatland | G06F 17/30622 |
| | | | 707/737 |
| 2011/0087684 A1 | 4/2011 | Junqueira et al. | |
| 2012/0130997 A1* | 5/2012 | Risvik | G06F 17/30864 |
| | | | 707/723 |
| 2013/0151534 A1* | 6/2013 | Luks | G06F 17/30622 |
| | | | 707/742 |
| 2015/0227624 A1* | 8/2015 | Busch | G06F 17/30982 |
| | | | 707/728 |

OTHER PUBLICATIONS

Bonacic et al., "On-Line Multi-Threaded Processing of Web User-Clicks on Multi-Core Processors", Jun. 22, 2010, High Performance Computing for Computational Science Â Vecpar 2010, Springer Berlin Heidelberg, Berlin, Heidelberg, pp. 222-235.

International Search Report from PCT/US2013/027562; dated Apr. 25, 2013; Blaine R. Copenheaver.

* cited by examiner

COMPUTER-IMPLEMENTED METHOD OF AND SYSTEM FOR SEARCHING AN INVERTED INDEX HAVING A PLURALITY OF POSTING LISTS

CROSS-REFERENCE TO RELATED APPLICATIONS

The present application claims priority to International Application No. PCT/RU2012/000697, entitled "Computer-Implemented Method of and System for Searching an Inverted Index Having a Plurality of Posting Lists", filed Aug. 24, 2012, which is incorporated herein by reference.

FIELD

The present invention relates to a computer-implemented method of, and a system for, searching an inverted index having a plurality of posting lists.

BACKGROUND

Today's large data centers manage collections of data comprising billions of data items. In such large collections, searching for particular items that meet conditions of a given search query is a task that consumes a significant amount of computing resources. It also takes a noticeable amount of time, even on the most powerful multiprocessor computer systems. In many applications, search query response time is critical, either because of specific technical requirements, or because of high expectation from human users. Various conventional methods are used to reduce search query execution time.

Typically, in building a search-efficient data collection management system, data items are indexed according to some or all of the possible search terms that may be contained in search queries. An "inverted index" of the data collection is created (and maintained and updated) by the system for use in the execution of search queries. An inverted index comprises a number of "posting lists". Each posting list corresponds to a search term and contains references to the data items that include that search term (or otherwise satisfy some other condition that is expressed by the search term). For example, if data items are text documents, as is often the case for Internet search engines, then search terms are individual words (and/or some of their most often used combinations), and the inverted indexes have one posting list for every word that has been encountered in at least one of the documents. In another example, the data collection is a database comprising one or more very long tables. The data items are individual records (i.e. the lines in a table) having a number of attributes represented by some values in the appropriate columns of the table. The search terms are specific attribute values, or other conditions or attributes. The posting list for a search term is a list of references (indexes, ordinal numbers) to records that satisfy the search term.

To speed up execution of search queries, the inverted index is typically stored in a fast access memory device (e.g. RAM) of one or more computer systems, while the data items themselves are stored on larger but slower storage media (e.g. on magnetic or optical disks or other similar large capacity devices). In this way, the processing of a search query will involve searching through one or more posting lists of the inverted index in the fast access memory device rather than through the data items themselves (in the slower access storage device). This generally allows search queries to be performed at a much higher speed.

To speed up search query processing further, a very large data collection is typically divided into a number of partitions commonly termed "shards", with each shard being hosted on a separate computer system (a "server") and having its inverted index. The data collection management system comprises networked means for distributing queries to all (or some—as the case may be) of the shards, and for collecting and aggregating the partial search results obtained by the processing of those distributed queries on their respective shards.

In applications where many search queries are to be rapidly processed in parallel, a further enhancement is often applied. Through this further enhancement, all (or some) of the shards are replicated, so that each shard exists within the data collection management system multiple copies. As an example, the data collection or the inverted index may be split into N shards, with each shard being replicated in M number of copies, called "replicas". Each individual search query is then replicated and distributed to the N shards for separate execution on each shard. At the shard level, the query is assigned for execution to one of the M replicas of each shard N. For example, a collection may be broken down into two shards [N=2] with each shard having three replicas [M=3]. Thus, there will be (a) shard 1, replica 1 [$Sh_{1-1}$];
(b) shard 1, replica 2 [$Sh_{1-2}$];
(c) shard 1, replica 3 [$Sh_{1-3}$];
(d) shard 2, replica 1 [$Sh_{2-1}$];
(e) shard 2, replica 2 [$Sh_{2-2}$];
(f) shard 2, replica 3[$Sh_{2-3}$];

and as an example, the query may be executed on shard 1, replica 3 [$Sh_{1-3}$] and on shard 2, replica 2 [$Sh_{2-2}$]; the query typically being executed on (a replica of) every shard. The results of the search on each shard would then be aggregated to yield a final search result.

Yet an additional level of parallelism can be achieved by further dividing the data collection into smaller shards, such that one server may host more than one of these smaller shards. In this way, a further parallelization for each individual search query can be achieved, by using, on a given server, a separate execution thread for every distributed query addressing one of such smaller shards on that server. In this way, if, for example, the entire data collection is divided into 2000 such "virtual shards" that are distributed among 1000 servers with two shards per server, then the processing of search queries will be carried out by 2000 parallel threads on 1000 servers, rather than by 1000 threads only.

However, such a static partitioning of a data collection into a greater number of shards may result in an overall loss in performance. This is because the execution time of a search query does not decrease inversely proportionally to the increase in the number of shards, but rather it decreases at a much slower rate. This can be explained by the fact that partial results obtained by processing individual distributed queries must then be aggregated, both on the same server (if that server hosts several virtual shards), and then over an inter-server network for shards on different servers. Such an aggregation task becomes more and more complex and more resource-consuming as the number of shards increases. Also, pruning (i.e. the early termination of a search according to some predefined criterion—such as the number of search results obtained) works more efficiently on longer shards.

Hence, in the above example with 1000 servers if the number of shards is increased from 1000 shards to 2000 shards, the average execution time of an individual search query may decrease to, for example, ⅔ of the original time that the execution took with 1000 shards, rather than to the expected ½ of the time. However each search query would now take up not one but two of the available threads on every server (for example, K threads), so the maximum total number of queries that may be executed in parallel will be halved. The total performance of the system when fully loaded will therefore decrease from K queries per one time unit to (½)(3/2)(K)=¾ K queries per time unit. Thus, when the system receives queries at an average rate greater than ¾ K queries per unit time, the excess queries will wait for their execution in an input queue. This will increase the total response time of the system, which is actually the opposite of what one was attempting to achieve in the first place. Therefore known methods of increasing the number of shards with a view to uniformly decreasing the execution time of search queries works sufficiently well up to a certain system load, and then starts to introduce an opposite slow-down effect.

The individual servers that host each shard, replica of a shard (in a multi-replica system), virtual shard, or replica of a virtual shard, are typically multiprocessor systems, with each processor having more than one processing core, and with each processing core being multithreaded. Thus each server is provided with the capacity of simultaneous multi-threading. These additional computing capabilities make it possible to simultaneously execute on one single physical server a number of parallel execution threads performing the same search query on different shards located on the server, different search queries on the same shard located on the server, and/or different search queries on different shards located on the server. While this is another enhancement to the search system, what is not currently conventionally possible is to have different threads execute the same search query on the same shard on the same server.

Aside from the number of resources that are available in a given system to execute search queries, there is an additional consideration with respect to executing search queries that must also be considered. This additional consideration concerns the fact that search queries do not have a uniform complexity. Some search queries are much more complex than others, leading to very different search execution times. For example, a search query containing two search terms that occur relatively frequently generally (e.g. two common English words), but that rarely occur together in the same document, would typically take much longer to execute than a search query containing two search terms that are relatively infrequently searched, but that are related somehow and often appear together in the same document.

Thus, while current conventional computer systems are adequate for the handling of simultaneous execution of multiple searches, improvement over such systems is nonetheless possible.

SUMMARY

It is an object of the present invention to ameliorate at least some of the inconveniences present in the prior art.

It is another object of the present invention to provide a computer-implemented method and system allowing for the simultaneous execution of multiple searches.

Thus, in one aspect, the technology described in the present specification provides a computer-implemented method of searching an inverted index having a plurality of posting lists, the method comprising:

receiving, via at least one server, a search query to be searched, the search query including a plurality of search terms;

multithreadedly searching, via at least one computer processor, a plurality of complementary sets of corresponding interspaced segments of each of the plurality of posting lists corresponding to the plurality of search terms, each of the plurality of complementary sets of corresponding interspaced segments being searched via a separate thread to yield per-thread search results;

aggregating, via the at least one computer processor, the per-thread search results, to yield aggregated search results; and transmitting, via the at least one server, at least a portion of the aggregated search results.

In another aspect, the technology described in the present specification provides a system comprising at least one server, the at least one server having at least one computer processor, and a non-transient computer information storage medium storing program instructions that when executed by the at least one computer processor cause:

a receipt of a search query to be searched, the search query including a plurality of search terms;

a multithreaded search of a plurality of complementary sets of corresponding interspaced segments of each of the plurality of posting lists corresponding to the plurality of search terms, each of the plurality of complementary sets of corresponding interspaced segments being searched via a separate thread to yield per-thread search results;

an aggregation of the per-thread search results, to yield aggregated search results; and a transmission of at least a portion of the aggregated search results.

In yet another aspect, the technology described in the present specification provides a non-transient computer information storage medium storing program instructions that when executed by at least one computer processor cause:

a receipt of a search query to be searched, the search query including a plurality of search terms;

a multithreaded search of a plurality of complementary sets of corresponding interspaced segments of each of the plurality of posting lists corresponding to the plurality of search terms, each of the plurality of complementary sets of corresponding interspaced segments being searched via a separate thread to yield per-thread search results;

an aggregation of the per-thread search results, to yield aggregated search results; and a transmission of at least a portion of the aggregated search results.

As was discussed hereinabove, a posting list for a given search term is typically a list of references to the data items in the data collection that include that search term. As such, one will understand that the more common the search term, the greater the number of references there will be in the posting list. For a ubiquitous search term, e.g. the English word "the", the posting list will include a reference to every data item in the data collection. For almost all other search terms this is not the case however and there will be gaps between data items in the data collection containing that search term formed by those data items that do not. Thus, for example, assuming the references in the posting list were to document numbers, there will be corresponding gaps in the document numbers in the posting list.

For purposes of the present specification a posting list will be considered (at least notionally) divisible into a series of segments, each segment being of a particular size, the size being related to the underlying data collection. This requires some discussion. For the purposes of illustration, it may be assumed that a given data collection of documents contains 100 documents total. The document collection thus has a size of 100 documents, the size being equal to the total number of documents in the collection. The documents in this document collection are numbered sequentially with documents numbers 1 to 100 inclusively.

The document collection may be (at least notionally) divided into document collection non-overlapping segments of 10 documents each. The document collection segments are numbered sequentially with document collection segment numbers 1 to 10 inclusively. Segment number 1 will contain documents numbered 1 to 10, segment number 2 will contain documents numbered 11 to 20, segment number 3 will contain documents numbered 21 to 30, and segment number 4 will contain documents numbered 31 to 40, and so on and forth.

A posting list for a given common search term (i.e. a search term found in relatively many, but not all, of the documents) will contain references, in the form of document numbers) to those documents in which the search term occurs. The references in the posting list are themselves in numerical order, although there will be gaps between the document numbers as the search term does not occur in documents having the skipped document numbers that form the gaps. The posting list itself may be (at least notionally) divided into posting list segments of 10 documents each (with respect to the entire document collection), however since there are gaps in the posting list, the length of the segment (i.e. the number of actual references to documents (i.e. the document numbers)) will likely be less than 10 (depending on where in the posting list the gaps occur). As such, the length of a segment of a posting list may even be zero, which would be the case if no documents within that segment contain occurrences of the search term in question. Thus, the size of a segment of a posting list is the number of references that would be present within that particular segment of the posting list were that posting list to contain a reference to every single document in the document collection. The length of a segment of the posting list (again, the number of references to documents actually present in that particular segment of the posting list) is often less than the size of that particular posting list segment.

In the above description it is stated that a posting list is divided "at least notionally" into segments. This should be understood that it is not required in the context of the present specification that a posting listing be actually physically divided in some form or another in order for the posting list to be considered to have been divided into segments. It is sufficient in the present context that the posting list be acted upon in a segmented fashion, irrespective of whether it is actually been physically divided. In fact it is foreseen at the present time that in many embodiments a posting list will not have actually been physically divided into segments.

In the context of the present specification two segments of a posting listing are "interspaced" with respect to each other if there is at least one segment of the posting list having a non-zero size between them that is not completely overlapped by one of them or both of them taken together. The length of that at least one intervening segment may be zero, but that is irrelevant as long as that at least one intervening segment's size is not zero. Thus, for example, were a posting list to be divided into notional non-overlapping segments having a size of 10 documents; segment 1 of that posting list (having for example a length of 6 documents) and segment 3 (having for example a length of 4 documents) of that posting list would be interspaced from one another (and be referred to as "interspaced segments") notwithstanding the fact that an intervening segment 2 between them had a length of zero.

Segments in similarly-segmented different posting lists are termed "corresponding" segments if they are the same number of segments away from the first segment in each posting list. Thus, the first segment of a first posting list $(S_1|P_1)$ corresponds to the first segment of a second posting list $(S_1|P_2)$; and the two segments $(S_1|P_1)$ and $(S_1|P_2)$ are said to be corresponding segments.

A "set of corresponding interspaced segments" is a collection of corresponding segments from amongst a group of posting lists. At a minimum there will be two distinct sets of corresponding segments of a group of posting lists. For example, a first set of corresponding interspaced segments of a group of two posting lists $P_1$ and $P_2$ would be the odd-numbered segments of each of the posting lists, and thus would have its members: $\{S_1|P_1, S_1|P_2, S_3|P_1, S_3|P_2, S_5|P_1, S_5|P_2, \ldots\}$. A second set of corresponding interspaced segments of the same two posting lists would be the even-numbered segments of each of the posting lists, and thus would have it its members: $\{S_2|P_1, S_2|P_2, S_4|P_1, S_4|P_2, S_6|P_1, S_6|P_2, \ldots\}$. The number of distinct sets of corresponding segments of a group of posting lists is not limited to two, however. Thus in another example, a first set of corresponding interspaced segments of a group of three posting lists would be $\{S_1|P_1, S_1|P_2, S_1|P_3, S_4|P_1, S_4|P_2, S_4|P_3, S_7|P_1, S_7|P_2, S_7|P_3, \ldots\}$; a second set would be $\{S_2|P_1, S_2|P_2, S_2|P_3, S_5|P_1, S_5|P_2, S_5|P_3, S_8|P_1, S_8|P_2, S_8|P_3, \ldots\}$; and a third set would be $\{S_3|P_1, S_3|P_2, S_3|P_3, S_6|P_1, S_6|P_2, S_6|P_3, S_9|P_1, S_9|P_2, S_9|P_3, \ldots\}$.

"Complementary sets" of corresponding interspaced segments are sets of interspaced segments whose union yields the entirety of all of the posting lists of that group of posting lists. Thus, in the foregoing example with a group of two posting lists, the set of the odd-numbered segments of each of the posting lists and the set of the even-numbered segments of each of the posting lists are together complementary sets of corresponding interspaced segments of those posting lists. However, in the foregoing example with a group of three posting lists, the first two sets are not, by themselves, complementary sets because their union does not yield the entirety of all of the three posting lists. In that example, all three sets, taken together, would be complementary sets because their union does yield the entirety of the all of the three posting lists.

In the context of the present specification, the expression "multithreadedly searching" is intended to mean that a search is carried out via at least two distinct threads of execution in a computer system. This expression is not intended to mean that any particular computer hardware is required to achieve this effect, as any suitable computer hardware capable of achieving this effect will suffice. Such computer hardware may, by way of non-limiting example, include otherwise suitable computer systems having multiple single-core processors, otherwise suitable computer systems having a single multiple-core processor, otherwise suitable computer systems having multiple multiple-core processors, etc.

In the context of the present specification, a "server" is a computer program that is running on appropriate hardware and is capable of receiving requests from client devices over a network, and carrying out those requests, or causing those requests to be carried out. The hardware may be one physical computer or one physical computer system, but neither is required to be the case with respect to the present technology. In the present context the use of the expression "at least one server" is not intended to mean that every request associated with a client device (or any particular request) will be received, carried out, or caused to be carried out, by the same server (i.e. the same software and/or hardware); it is intended to mean that any number of software elements or hardware devices may be involved in receiving/sending, carrying out or causing to be carried out any request, or the consequences of any request, associated with a client device, and all of this software and hardware may be one server or multiple servers, both of which are included within the expression "at least one server".

The aggregation of the per-thread search results may be effected in any suitable conventional manner used to aggregate search results. As a non-limiting example, the per-thread search results may be aggregated in any suitable manner similar to what is conventionally done with respect to partial search results stemming from a search query having been distributed to multiple shards for execution. It is not required that the same computer processor(s) perform the aggregation of the per-thread search results as performed the search itself, but this may be the case.

Thus, at a very high level, the present technology may be conceived of as allowing for a search query to be executed on a single shard on single server using multiple execution threads operating in parallel. This is achieved via the segmentation of the relevant posting lists, and having different sets of the segments acted upon by different threads of execution simultaneously. As those skilled in the art would appreciated the present technology may provide for several advantages over conventional systems, including, for example, allowing for better load balancing between the various servers being part of the system carrying out search requests.

In some embodiments the method includes, prior to multithreadedly searching, calculating, via the at least one computer processor, a weight of the search query. In the present context the "weight" of the query is a characteristic of the query derived from statistical characteristics of its constituent search terms. The resulting weight of a search query reflects that query's "complexity" in terms of the number of elementary operations needed for its execution, or, equivalently, in terms of the time needed for that query's execution on a given configuration of shard replica servers (with a given processor and memory speed, etc.), were the search query to be executed by a single execution thread in each shard. In some such embodiments, only if the weight of the search query exceeds a threshold weight value is the plurality of complementary sets of corresponding interspaced segments of each of the plurality of posting lists corresponding to the plurality of search terms multithreadedly searched to yield per-thread search results. Thus, in some such embodiments, relatively simple search queries are executed via a single thread, whereas relatively complex queries are executed via multiple threads. Doing so allows the relatively simple searches to be executed without any materially increased execution time (as compared with conventional methods) as no per-thread result aggregation need be performed, while at the same time the execution time for relatively complex searches will likely decrease, as multiple threads of execution per shard are being used to execute the search. This may be an advantage in that ordinary users of search engines typically have no idea about the complexity of the searches that they are asking to be performed (or even the fact that search queries can vary in complexity), and they expect a short response time for whatever query they are sending into the system. Some embodiments of the present technology may thus assist in providing users with a relatively short response time for most queries.

In some embodiments, the weight of the search query is a function of a length of the plurality of posting lists corresponding to the plurality of search terms. In such embodiments this may allow for the determination of the approximate relative length of time it will take for the search to be performed, which may serve as a stand-in of the search's complexity.

In some embodiments, a number of sets in the plurality of complementary sets of corresponding interspaced segments of each of the plurality of posting lists corresponding to the plurality of search terms is a function of the weight of the query. In such embodiments, each set will be assigned to a thread of execution. In this manner, the higher the weight of the search query, the greater the number of sets that the posting lists will be divided into, thus the greater the number of threads of execution that will be assigned to the search query's execution.

In some embodiments, a number of sets in the plurality of complementary sets of corresponding interspaced segments of each of the plurality of posting lists corresponding to the plurality of search terms is a function of a number of separate threads. Such embodiments may be the reverse of those described in the previous paragraph. In these embodiments, a number of threads of execution are assigned to the execution of the search query, and given that number of assigned threads, the number of sets are determined and/or defined.

In some embodiments, the number of sets in the plurality of complementary sets of corresponding interspaced segments of each of the plurality of posting lists corresponding to the plurality of search terms is not greater than a number of sets limit value. Similarly to what was discussed above with respect to diminishing returns when increasing the number of virtual shards, in some embodiments there may be diminishing returns in ever increasing the number of threads assigned to a particular query (and correspondingly the number of segments into which each posting list is divided) given the increasing complexity in aggregating the per-thread search results. Thus in some embodiments, the weight (or complexity) of the search query notwithstanding, there will be a limit to the number of sets of segments into which the posting lists are divided.

In some embodiments, each of the plurality of posting lists corresponding to the plurality of search terms references a plurality of indexed items, the indexed items being sequentially numbered. This for example, as was discussed above, is typically the case when dealing with Internet search engines, where the indexed items are sequentially numbered with document numbers.

In some embodiments, each of the plurality of posting lists corresponding to the plurality of search terms is a differential posting list. Differential posting lists are discussed in detail hereinbelow.

In some embodiments, each of the plurality of posting lists corresponding to the plurality of search terms references a plurality of indexed items, the indexed items being ordered in an order of decreasing query-independent relevance. This is typically the case in respect of Internet search engines, in which the index items are not randomly inserted into the data collection. Typically, the items in the data collection are ordered within the data collection in an order of decreasing query-independent relevance. In this manner, the data items that are statistically more likely to be part the search results of any given search query will be arranged so as to be searched towards the beginning of the search. They are thus likely to be located more quickly than if the data in the data collection had been randomly entered.

In some embodiments, segments in each of the plurality of complementary sets of corresponding interspaced segments of each of the plurality of the posting lists corresponding to the plurality of search terms do not overlap with (are non-overlapping with) adjacent segments in others of the plurality of complementary sets of corresponding interspaced segments of each of the plurality of posting lists corresponding to the plurality of search terms. In the context of the present specification consecutive segments of a posting list are "adjacent" to each other. I.e. segment two of a first posting list ($S_2|P_1$) has as its adjacent segments segment one of the first posting list ($S_1|P_1$) and segment three of the first posting list ($S_3|P_1$). In the context of the present specification, adjacent segments of a posting list are "non-overlapping" if they do not contain any references to any common data item. In these embodiments, this effectively means that data items will never be searched by different threads executing the same search query.

In some embodiments, at least one segment in each of the plurality of complementary sets of corresponding interspaced segments of each of the plurality of posting lists corresponding to the plurality of search terms overlaps with at least one adjacent segment in others of the plurality of complementary sets of corresponding interspaced segments of each of the plurality of posting lists corresponding to the plurality of search terms. In the context of the present specification, adjacent segments of a posting list are "overlapping" if they do contain a reference to at least one data item in common between them. Effectively, this means that there is the potential that data items will be searched by more than one thread executing the same search query.

In some embodiments, each of the plurality of posting lists corresponding to the plurality of search terms includes a plurality of markers segmenting that posting list, the pluralities of markers being coordinated across the plurality of posting lists corresponding to the plurality of search terms such that each of the plurality of posting lists corresponding to the plurality of search terms is similarly segmented with respect to the others of the plurality of posting lists corresponding to the plurality of search terms. In such embodiments, a marker will point to (at least) the beginning of each segment. There may or may not be markers pointing to other points within a segment.

In some embodiments, spacing between at least some of the markers segmenting at least one posting list of the plurality of posting lists corresponding to the plurality of search terms varies. Thus, in such embodiments, the size of at least some of the segments (when compared to others of the segments) differs.

In some embodiments, spacing between at least some of the markers segmenting at least one posting list of the plurality of posting lists corresponding to the plurality of search terms increases. Thus, in such embodiments, the size of at least some of the segments increases as one progresses through the posting list in question.

In some embodiments, the segments of each of the plurality of complementary sets of corresponding interspaced segments of each of the plurality of posting lists corresponding to the plurality of search terms are of a fixed size—i.e. the size of the segments does not change as one progresses through the posting list. In some such embodiments, the segments of each of the plurality of complementary sets of corresponding interspaced segments of each of the plurality of posting lists corresponding to the plurality of search terms are of a same fixed size—i.e. all of the segments of all of the posting lists are of the same size. In others of such embodiments, the segments of each of the plurality of complementary sets of corresponding interspaced segments of each of the plurality of posting lists corresponding to the plurality of search terms are of a variable fixed size. In others of such embodiments, the segments of each of the plurality of complementary sets of corresponding interspaced segments of each of the plurality of posting lists corresponding to the plurality of search terms are of an increasing fixed size.

In some embodiments, at least some of the segments within at least one set of the plurality of complementary sets of corresponding interspaced segments of each of the plurality of posting lists corresponding to the plurality of search terms vary in length. In fact, as one skilled in the art would understand, this will be the case in many cases because of the variance in the occurrence of the search terms in the data items and the segmenting of the posting lists by size.

In some embodiments, at least one of the segments within at least one set of the plurality of complementary sets of corresponding interspaced segments of each of the plurality of posting lists corresponding to the plurality of search terms has a length of zero. (Segments having a length of zero were previously discussed hereinabove.)

In some embodiments, corresponding segments of the plurality of complementary sets of corresponding interspaced segments of each of the plurality of posting lists corresponding to the plurality of search terms, as between different sets of the plurality of complementary sets of corresponding interspaced segments of each of the plurality of posting lists corresponding to the plurality of search terms, differ in length. In fact, as one skilled in the art would understand, this will be the case in many cases because of the variance in the occurrence of the search terms in the data items and the segmenting of the posting lists by size.

In some embodiments, multithreadedly searching, via at least one computer processor, a plurality of complementary sets of corresponding interspaced segments of each of the plurality of posting lists corresponding to the plurality of search terms, includes at least one segment of at least one of the sets of corresponding interspaced segments of each of the plurality of posting lists corresponding to the search terms being skipped. This will be likely the case in situations where it is not possible for there to be references to any data items that could be a search result in the segment being skipped. Skipping such segments will likely decrease the overall execution time of the search.

In some embodiments, multithreadedly searching, via at least one computer processor, a plurality of complementary sets of corresponding interspaced segments of each of the plurality of posting lists corresponding to the plurality of search terms, includes at least two of the threads being executed by the at least one computer processor at least partially in parallel. The execution of at least two threads at least partially in parallel will likely decrease the overall execution time of the search.

Embodiments each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, objects, aspects and advantages of the present technology will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION—INTRODUCTORY CONCEPTS

Figure 1:
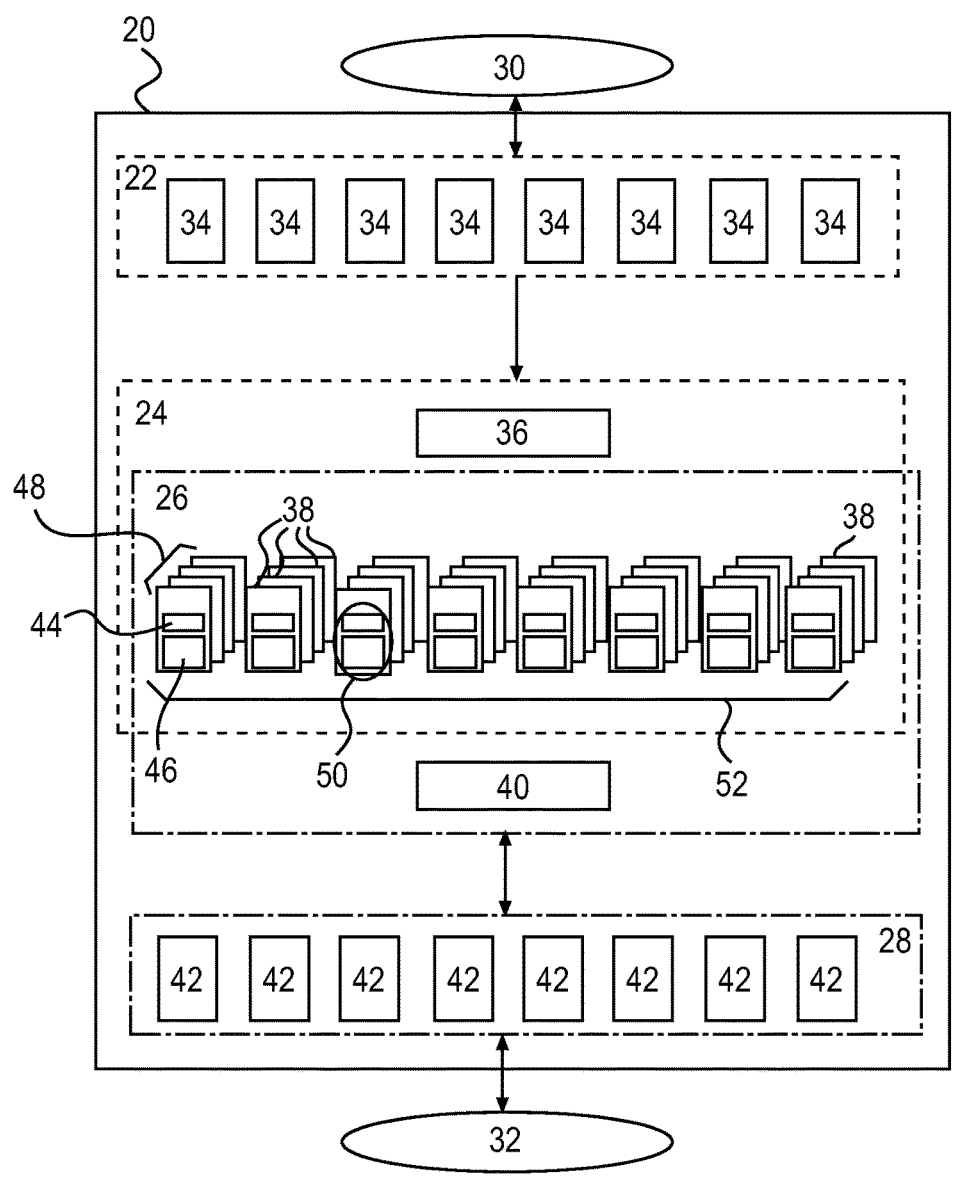
FIG. 1 is a schematic view showing some of the various software and hardware components of an Internet search engine system being an embodiment of the present invention.

As an aid to understanding, the following introductory information is provided. The description that follows in this section is not an attempt at defining (and is not intended to define, limit or otherwise restrict) the scope of the present technology, but simply to provide information related to the present technology as an aid in its understanding.

One technological area in which the present technology may be of use is in the field of Internet search engines. Internet search engines are computer systems that are used to find information that is available on the Internet. Although the present technology may be used in other fields as well (for example, with respect to large databases), it is believed that Internet search engines provide a good example for purposes of illustration and understanding.

An Internet search engine will typically have a data collection including, amongst other things, a very large number of Internet webpages, which, together with their associated hyperlinks, may be referred to as "documents". (Although a typical data collection will typically comprise other resources available on the Internet than just the documents, for ease of understanding, only the documents need be considered herein.) The documents are typically entered into the data collection via the execution of a background webpage indexing process that is generally referred to in the art as a "crawler". The total number of documents in the data collection to be indexed and rendered searchable may typically be anywhere from 10 billion to 100 billion, depending on variety factors such as, for example, the linguistic scope of the data collection (i.e. does the data collection contain documents in only one language or in several, and if so, which one or ones.)

A large data collection will typically be partitioned into between 10,000 and 50,000 shards, with each shard being hosted on its own server with the various servers being clustered or networked. (Such a number of shards is conventionally technically achievable and is considered to be efficient by conventional standards.) Therefore, depending on the number of documents in the data collection and the number of shards into which the data collection is split, each shard might typically handle anywhere from 1 million to a few million documents.

To increase the performance and the fault tolerance of the system, multiple replicas of each shard (typically anywhere from between 2 and 10) are present in the search engine system. The existence of these shard replicas, together with the multithreaded capability of the computers hosting them, makes it possible for the system to execute tens to hundreds of search queries in parallel. The queries will typically be distributed for execution as evenly as possible among several replicas (without distinction) to achieve a load-balanced system. Having replicated shards also provides the system with the ability to simultaneously update some of the replicas (e.g. to enter newly found and indexed documents) while still having others of the replicas execute (or being available to execute) search queries.

For a typical data collection, the number of individual terms that may be searched—search terms—may be as large as 100 million, 10 million of which are correctly spelled words in various languages, with the other 90 million being a combination of hyperlinks (web addresses) and misspelled words. Hence, each shard maintains tens of millions of individual posting lists, the shortest ones of which may have just a few entries, while the longest ones of which (e.g. those corresponding to the most common words in the language(s) of the data collection) may contain up to a few million entries.

With reference to FIG. 1, a conventional search engine 20 typically comprises the following subsystems: a web crawler subsystem 22, a document indexing subsystem 24, a search query execution subsystem 26, and a user serving subsystem 28. Reference number "30" refers to the World Wide Web as the collection of all web pages (documents) being searched for. Reference number "32" refers to all human users that request search services from the search engine 20 via their respective client programs (e.g. web browsers, smartphone apps, etc.) as well as to any other automated agents that may request such services.

The search engine 20 operates on a clustered or networked set of computers 34, 36, 38, 40, 42, hereinafter called servers. The servers 34, 36, 38, 40, 42 communicate between themselves and/or with one or more other computers via any suitable means, such a fast data communications network (e.g. a local area network (LAN)). The above four subsystems are symbolically represented in FIG. 1 by large rectangles formed by dashed lines and containing those servers that participate in performance of those subsystems' respective tasks. Thus, in this example, servers 34 are part of the web crawler subsystem 22; server 36 and servers 38 are part of the document indexing subsystem 24; servers 38 and server 40 part of the search query execution subsystem 26; and servers 42 are part of the user serving subsystem 28. The search engine 20 may optionally in other embodiments comprise other subsystems in addition to those shown on FIG. 1. Arrows in FIG. 1 represent data flows between the subsystems of system 20, rather than between individual servers.

The web crawler subsystem 22 operates on servers 34 and feeds its results into the document indexing subsystem 24, and particularly into the document indexing system's coordinating server 36. The user-serving subsystem 28 operates on servers 42 and communicates in both directions with the search query execution subsystem 26, namely, with its coordinating server 40. The document indexing subsystem 24 operates on the set of servers 38 via its coordinating server 36, while the query execution subsystem 26 operates on the same set of servers 38 via its coordinating server 40. Many of the functions of the document indexing subsystem 24 and the search query execution subsystem 26 are performed in a distributed way, separately on some or each of the servers 38. Every server 38 operates the same set of software components, including an agent of the document indexing subsystem 24 and an agent of the search query execution subsystem 26 (not shown on FIG. 1).

Every server 38 is provided with a fast access data storage device 44 (e.g. RAM) and a slower access large capacity data storage device 46 (e.g. magnetic disks or other types of large capacity storage devices). The servers 38 collectively maintain a large collection 52 of data items (in the present embodiment—the inverted indexes—described below) in their fast access data storage devices 44, and also (in the present embodiment—the documents) in their slower access data storage devices 46. In some variations of this kind of system, the servers 38 may be provided with fast access storage only, with no additional slower access storage. In such cases, fast access data storage devices 44 have a sufficiently large capacity to also play the role of slower access data storage modules 46.

The whole data collection 52 is created and updated by the document indexing subsystem 24, and is searched by the search query execution subsystem 26. Portions of the data collection 52 that are stored in the data storage modules 44, 46 of different servers 38, are called shards 50 (as was noted above). Servers 38 are typically organized into groups 48, every group 48 containing at least two servers. In FIG. 1, four servers 38 are shown in every group 48, and for purposes of illustration they are shown one behind another. Servers 38 within the same group 48 are considered "replica servers" relative to each other as they contain replicas of the same shard 50. Every group 48 of servers 38 operates on its own shard 50 (in multiple replicas), generally without any required interaction with servers 38 in other groups 48. (In FIG. 1 one replica of one shard is schematically shown with reference number 50, with a more detailed representation thereof being shown in FIG. 2.)

In some variations of the aforementioned systems, the document indexing subsystem 24 and the search query execution subsystem 26 may each have more than one coordinating server 36, 40 (respectively) to perform their centralized functions, or they may have no such server at all (in which case the proper distribution of new documents and of new queries can be achieved via appropriate distribution algorithms present on all the servers 38). In other variations, some or all of the servers 34 and 42 may share their functions with the servers 38, so that the latter perform the functions of the web crawler subsystem 22 and/or the user serving subsystem 28 as well as the functions of the document indexing subsystem 24 and the search query execution subsystem 26.

In the discussion that follows, only those aspects and functions of each of the subsystems 22, 24, 26 and 28 that are believed to be necessary for understanding the present technology are discussed in detail.

The web crawler subsystem 22 performs systematic automatic browsing of the web (symbolically represented in FIG. 1 with reference number 30), in order to find new or recently modified webpages. The search engine 20 stores copies of these webpages, together with their web addresses (commonly called "hyperlinks"), in the data collection 52. Alternatively in other embodiments, the search engine 20 may store only the hyperlinks. In either case, the items added to the data collection 52 (be they webpages, or hyperlinks to webpages), as was noted above, are referred to herein as documents. Servers 34 collectively perform the tasks of the web crawler subsystem 22, for example with different servers 34 assigned to inspect different parts of the web. In some variations, the web crawler subsystem 22 may comprise just one server 34. No particular number of servers 34, no particular distribution of tasks between them, and no particular method of operation of the web crawler function, are required with respect to the present technology.

The document indexing subsystem 24 receives from the web crawler subsystem 22 new or recently modified documents having been located thereby. Every such document is analyzed via the coordinating server 36 to estimate its overall potential relevance to users. This is known in the art as query-independent ranking the documents. Different methods of query-independent ranking are known in the art, based on different principles of estimating document relevance. These different conventional ranking methods will vary (sometimes significantly) in the results that they generate, and there exists a large body of literature comparing various conventional ranking methods in terms of usefulness of their results. The present technology does not depend on the choice of ranking method however, or even whether the documents are ranked at all.

The coordinating server 36 (in embodiments that have such a server) then distributes the new documents among the shards 50, for example, such that every document is placed into just one of the shards 50. This may be done according to any conventional method, e.g. in such a way so as to equalize both the total number of documents per shard 50 and the number of documents of any given rank in every shard 50. In some variations, some documents may be dispatched to more than one shard 50, e.g. in cases when this is useful for search acceleration. In some other variations, the documents may be distributed among the shards randomly, before their ranking, and then their ranking is then performed separately within the shard in which they are located. In yet other variations, distribution of new documents among the shards 50 is achieved by performing an appropriate distribution algorithm on all the servers 38, without any coordinating server 36 at all.

A document sent by the coordinating server 36 to a given shard 50 is stored in the slower access large capacity storage device 46 of one of the replica servers 38 of that shard (or in the fast access storage device 44 of server 38 in cases where the slower access large capacity storage 46 is not present, or if present, is not being used). The agent of the document indexing subsystem 24 on the server 38 that has received the document performs the indexing procedure described hereinafter. The indexing procedure may significantly modify some of the shard data used by the search query execution subsystem 26 in executing search queries (as is discussed in more detail hereinbelow). Therefore, during the time that the indexing procedure is being performed on any given replica of a shard 50, that particular replica is made unavailable for use in executing search queries. Incoming search queries will be executed on other replicas of that shard 50 that are not in the process of being updated (such replicas may have already been updated or may not yet have to be updated—as the case may be). Thus, as any given point in time, each replica server 38 is typically under the control of either the document indexing subsystem 26 or the search query execution subsystem 26, but not both simultaneously. When the indexing procedure is terminated on one replica server 38, the updates (or the whole updated shard—as the case may be) are then copied onto other replica servers 38, typically one after another, making each replica server 38 unavailable for use in executing search queries on the replica being updated, during the time that that the replica on that particular server 38 is being updated.

In an alternative system, one of the replica servers 38 in each group 48 of replica servers 38 is a "master server" (not particularly identified in the drawings) devoted to maintaining a "master copy" of the shard 50 of that group 48. The master server will be used for document indexing only and never for executing search queries. The other replica servers 38 of that group 48 of replica servers 38 will receive regular updates of the shard 50 from the master server. At any particular point in time, those replica servers 38 that are not then currently being updated will accept and execute search queries. Such a system is structured so as to be able to regularly update the shard 50 on the various replica servers 38 of the group 48, without interrupting (as much as is then possible) execution of new search queries.

Document indexing for a given replica server 38 maintaining one replica of a given shard 50 will now be described. (In the subsequent description of the document indexing process, for purposes of simplicity, a shard replica will simply be referred to as a shard.) First the structure of the inverted index of a shard 50 will be described, and then the process of updating that shard 50 when new documents are received and indexed will be described.

All the documents contained in any shard 50 are numbered, typically by using consecutive natural numbers. Such a numbering scheme will typically start from 0 or 1, but may start from any number. A document's document number within a shard 50 uniquely identifies that document within that shard 50. Documents in different shards 50 are typically numbered independently, so that the same document number will almost certainly identify different documents in different shards 50. The numbering of documents in any one shard 50 is typically done with the documents ordered in a decreasing order with respect to their query independent relevance or rank. Thus, in such a system, the higher the document number, the lower the query-independent rank of the document. (Alternatively documents in a shard 50 could be numbered in an increasing order with respect to their query-independent rank according to any conventional technique, and in such a case the higher the document number, the higher the query-independent rank of the document.)

Every document in a shard 50 is indexed for the purpose of being searchable. The process of indexing a document consists of determining which words (in whatever language), which web addresses (hyperlinks), and/or which other special terms that are considered to be potential search terms, occur within the document. In some cases, some phrases (e.g. sequences of words) could also be considered search terms, and if so those phrases would themselves become part of the indexing process. In some document indexing processes, a search term will include different lexical representations, e.g. different grammatical forms of the same basic word. What will be used as search term and what will not, is defined by a specific search policy of a given search engine. A public general-use Internet search engine service typically considers every word in any language as a valid search term.

For any given search term (e.g. a word, a hyperlink, a special term, or a phrase), the document indexing process builds and maintains a list of references to documents containing that search term—the posting list of that search term. Thus, a posting list for a search term for a shard contains a reference to each document within that shard in which that search term occurs at least once. The reference to a document (commonly called a "posting"—hence the term posting list) may be that document's document number. Each posting list is ordered with the document numbers of the referenced documents being in ascending order. As an example, a posting list for a given term in a given shard may start with document number 5, and include, in order, document numbers 7, 8, 40, 41, 64, and so on. The list would not include any number less than 64 not mentioned (as in this example the search term did not occur on those documents with those document numbers). Thus, such a posting list may be represented as {5, 7, 8, 40, 41, 64, . . . }. Such a posting list is termed herein an "absolute posting list" as the references therein are to the actual document number of the documents.

Alternatively, a reference to a document in a posting list may be the difference between that document's document number and the document number of the document in the posting list immediately preceding that document. For example, were the first document in the posting list document number 5, then that document number would be present in the posting list. If, in the same example, the second document were document number 7, then the number 2—the difference between 7 and 5—would be the following number in the posting list. A posting list so structured is termed a "differential posting list". Thus in the example above the absolute posting list {5, 7, 8, 40, 41, 64 . . . } would be {5, 2, 1, 32, 1, 24 . . . } if represented as a differential posting list.

Differential posting lists may be used in certain instances where they have advantages over absolute posting lists, e.g. differential posting lists take up less space in memory.

The determination of the actual document numbers being referenced in a differential posting list such as the one set forth above can be done sequentially, starting from the first document in the posting list. This numbering method may be highly inefficient when used to determine the document number of documents that are relatively far from the beginning of a very long posting list. In order to minimize this inefficiency, a series of pointers may be set along each posting list. Each pointer would indicate some intermediate position within the positing list and corresponds to an absolute document number. This can be done for example by attaching to each posting list a separate array of such pointers (commonly called a "sub-index" for that posting list). Alternatively, a posting list could be divided into portions with each portion starting with a header indicating, for example the absolute document number of the document then currently being examined, as well as the length of that portion of the posting list (i.e. the number of documents in that portion).

The above procedure for the indexing of documents is performed on each shard 50 independently of the other shards 50, so that each shard 50 is a self-contained collection of data that includes a sub-collection of the totality of the documents (available across all of the shards 50 and thus available to be searched for by the search engine 20) and that shard's set of posting lists (including those positing lists' sub-indexes) for all search terms occurring in that sub-collection of documents. As was previously mentioned herein, the whole set of posting lists for any particular shard 50 constitutes the inverted index for that shard 50. The documents themselves are typically stored in the slower-access large capacity data storage device 46 of each replica server 38, while the inverted index is stored in the fast access storage device 44 of the servers 38. (Optionally, as is conventionally known, a shard 50 may also contain additional information useful for executing search queries and for delivering the most relevant results.)

There will likely be a posting list for most search terms in every shard 50. Although obviously in different shards 50 the posting lists for the same search terms will contain references to different documents. On the other hand, for some of very rarely occurring search terms, it may be that in respect of any particular shard there is no posting list corresponding thereto at all, or that such a posting list exists in that shard 50 but is empty.

Figure 2:
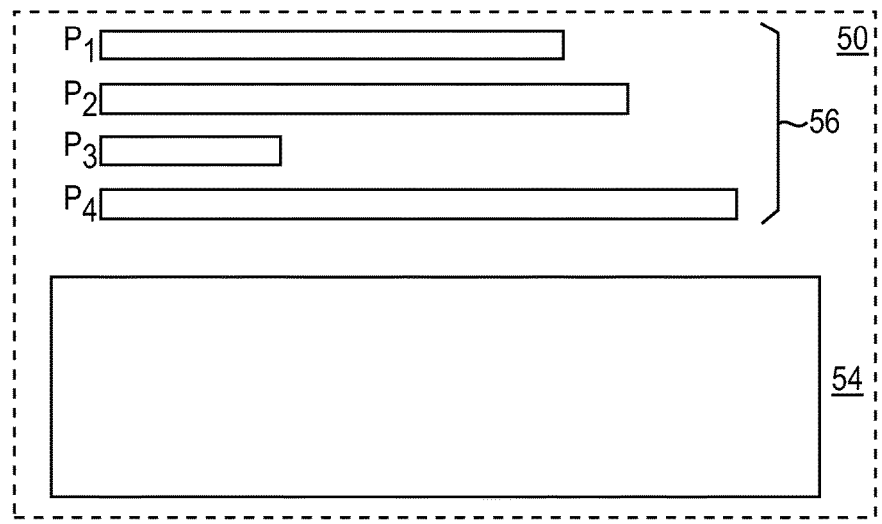
FIG. 2 is a schematic view showing some types of data within one shard of a document collection managed by the system of FIG. 1.

Referring to FIG. 2, a shard 50 contains a collection of documents—collectively referred to as collection of documents 54—and an inverted index 56 for the collection of documents 54. The collection of documents 54 of the shard 50 is a sub-collection of the whole collection of documents (i.e. the whole collection of data) managed by the system 20. Referring back to FIG. 1, the collection of documents 54 is stored in the large capacity storage device 46 of the server 38, while the inverted index 56 is stored in the fast access storage device 44 of the same server 36. Again referring to FIG. 2, the inverted index 56 contains a very large number of posting lists of which four ($P_1$, $P_2$, $P_3$, $P_4$) are representatively shown. The shown posting lists $P_1$, $P_2$, $P_3$, $P_4$ are in respect of search terms $T_1$, $T_2$, $T_3$, $T_4$ respectively (whatever those terms may be). In many practical configurations, the number of different search terms (and hence of different posting lists corresponding thereto) that will be managed in respect of the shard 50 may be as large as 100 million (of which only approximately between 10 and 20 million will be posting lists in respect of words in various different languages, with the remaining 80 to 90 million being in respect of hyperlinks, words containing orthographic errors, and other various character strings). For the shard 50 containing approximately one million documents, the length of any given posting list of that shard 50 may be as short as just one entry for a rarely used special term and as long as hundreds of thousands of entries for common words. In FIG. 2 posting lists $P_1$, $P_2$, $P_3$, $P_4$ are graphically shown as being of different size rectangles to simplistically illustrate the fact that the posting lists $P_1$, $P_2$, $P_3$, $P_4$ are of different relative lengths (i.e. have different numbers of documents referred to therein.)

Adding new documents to existing shards 50 is typically a batch process that operates on a set of newly received documents. Each new document is received by a server 38 that manages one replica of one shard 50 and makes updates to it. The document comes from the coordinating server 36, or, alternatively, is directly distributed from the web crawler subsystem 11. The document is assigned some query-independent rank (as was discussed hereinabove) by the coordinating server 36 or directly by the server 38. In most cases, the new document will be placed in the shard 50 according to its received rank, i.e. between two existing documents in the shard 50, one of a greater rank and one of a lesser rank. The entry of new documents in the shard 50 will require renumbering of all of the subsequent documents within the shard 50.

As part of the indexing process, the new document will be indexed (e.g. search terms therein will be located), references to it will be inserted in the appropriate posting lists, and any changes caused by the renumbering of any document resulting from the insertion of the new document into the shard will be effected. If the posting lists are absolute posting lists, then all of the references in the posting lists to documents subsequent to the inserted document will need to be changed. However, if the posting lists are differential posting lists, only the reference in the posting list immediately following the reference to the inserted document inserted into the posting list will need to be modified, which is one of the advantages of using differential posting lists. (The previous explanation used the insertion of a single document for purposes of illustration. As was noted above, however, a batch of document may be entered at the same time rendering the renumbering and re-indexing operations slightly more complex.)

At a high level then, the whole process of updating a shard can be described as merging of the existing ordered set of documents with an ordered set of new documents, indexing every new document, and updating both the appropriate posting lists and their respective secondary indexes. As was discussed above, the updating is first performed on one replica of a shard, and once that replica is updated, the updated data can be propagated in turn to the other replicas of that shard.

Turning now to consider the execution of search queries, generally speaking, each search query may be considered to be a series of one or more search terms, and the search terms thereof may be represented as $T_1, T_2, \ldots T_n$. Thus, the search query may be understood as a request to the search engine 20 to locate every document within each of the shards 50 containing each and every one of the search terms $T_1, T_2, \ldots T_n$ (the logical equivalent of an "AND" between the search terms; i.e. every document resulting from the search must contain at least one occurrence of the word $T_i$, for every i from 1 to n). This is the simplest form of executing a search query.

It should be noted that for multi-term search queries search engines often are configured not only to search for documents including occurrences of each one of the search terms of the query, but also to search for some additional documents that merely lack one of the less significant search terms (but contain all of the more significant ones). Which ones of the search terms that are "less significant" to the query is determined by applying what is known in the art as the "quorum" principle. This principle consists in heuristically assigning different weights to each of the individual terms $T_1, T_2, \ldots T_n$ in a search query, and setting a "quorum value" that is less than the sum of weights of each of those terms. Documents that attain the search quorum value are considered as valid search results notwithstanding the fact that they may be lacking one of the less significant search terms.

Referring to FIG. 1, search queries are formulated by human users 32 and are, for example, sent over an Internet connection to the search engine 20. The search queries are received by and handled by the user-serving subsystem 14 at any time and asynchronously. Typical search query response time should remain within some delay acceptable to most users of the system, typically no more than a couple of seconds. Search queries in the incoming search query queue (not shown) may be either distributed among the servers 42 of the user-serving subsystem 28, or centralized on one of those servers 42. In some variations, the entire user-serving subsystem 28 may be implemented on a single server 42.

Search queries in the incoming search query queue are sent by the server(s) 42 to the coordinating server 40 of the query execution subsystem 26. In some variations, the functions of the coordinating server 40 may be performed by a set of several servers, or by the servers 38, or by any other configuration of servers. After a search query is executed (as described hereinbelow) in parallel in one replica of each of the shards 50, the results are sent by the various shard replica servers 38 back to the coordinating server 40, where they are aggregated to produce a single search result (typically a list of relevance-ordered documents). In some variations, this aggregated list may be subject to some additional filtering and reordering. The resulting list is delivered to the user 32 who had originated the search query, via the user-serving subsystem 28.

With respect to the execution of a search query, as was discussed above, a sample query Q={$T_1, T_2, T_3$} should be understood "find all documents having occurrences of each of the search terms (typically words) $T_1$, $T_2$, and $T_3$". It should also be understood that the posting lists that correspond to these search terms will be denoted $P_1$, $P_2$, and $P_3$ respectively. This is a particular case of a more general search query $Q=\{T_1, T_2, \ldots T_n\}$ with n search terms. This particular case is considered only for the sake of simplicity and illustration.

For a given shard, the search query execution procedure will explore each of three posting lists $P_1$, $P_2$, $P_3$ in parallel (assuming that these posting lists exist in respect of the shard in question), starting at the beginning of each posting list. The search query execution procedure maintains for each posting list $P_x$, a current pointer CURRENTDOC($P_x$) into the list. This pointer is a function that returns the document number of the document that is specified at the list position that the pointer is pointing to, be it either the absolute document number or a differential document number—as the case may be. In the example referred to hereinabove, there was an absolute posting list, which shall now be termed $P_A$, with the following contents {5, 7, 8, 40, 41, 64 ... }. Were the pointer CURRENTDOC($P_A$) pointing to the third ($3^{rd}$) position in the posting list, then "8" would be returned as the document number to which the pointer were pointing.

There is another important function SKIP that must be understood. SKIP(N, $P_x$)—where N is some document number—can be applied to any posting list $P_x$ and will move that posting list's CURRENTDOC($P_x$) pointer to a new position such that the document in that new position has the smallest document number greater or equal to N. The function SKIP(N, P) will return that new document's document number. Thus, continuing with the example from the previous paragraph and posting list $P_A$, were the function SKIP(50, $P_A$) to be applied to the list $P_A$, then the CURRENTDOC($P_A$) pointer would be moved to the sixth ($6^{th}$) position in the list and would return the document number 64, as the first document number in the posting list greater than or equal to 50 is the document number 64. The function SKIP(50, $P_A$) would produce exactly the same result, were it applied to the posting list $P_A$ instead.

In some variations, performance of the function SKIP(N, $P_x$) for large values of N (for which a long portion of the posting list $P_x$ should be skipped preferably in as few operations as possible) can be accelerated by using a sub-index of pointers or a sequence of portions of the posting list $P_x$, as described hereinabove. For example, if SKIP(10240, $P_x$) is to be applied to a posting list $P_x$ for which a sub-index is maintained in the shard 50, the sub-index having a series of pointers allowing portions of document numbers within the posting list $P_x$ that are multiples of 1024 that are contained within the limits to be skipped, then SKIP(10240, $P_x$) can be performed by first skipping over 9 pointers (from the current pointer in the sub-index) and then return to a more detailed inspection of the posting list $P_x$ starting from the position therein that is pointed to by the $10^{th}$ pointer. In other variations, a similar method can be used where portions of posting lists are defined by portion length indications contained in the portion headers rather than by pointers from a separate sub-index.

The search query execution procedure is an iterative process that will create a new posting list R containing the results of the search that are found, i.e. the document numbers of those documents (in ascending order) that satisfy all the search criteria of the query Q (i.e. in which each of the search terms—the previous example $T_1$, $T_2$, $T_3$—occur).

A typical such procedure for the execution of a search is set forth herein below. The procedure starts at STEP 0, with the iterative steps being STEPS 2 to 7. The procedure stops when the end of at least one of the participating posting lists (this expression is defined below) is reached (in STEP 7), or when some maximum number X of results has already been placed in the resulting list R (i.e. the pruning limit discussed hereinabove has been reached). (The pruning parameter X might, for example, be defined by the coordinating function in the coordinating server 40 on a per query basis and provided with each query Q to the servers 38, or it might, for example, be a set parameter fixed for all queries). The procedure maintains a variable denoted "DOCMAX" that indicates, at any given moment, the highest document number having been reached at that moment, that is, the maximum value of each of the then current document numbers in each the participating posting lists $P_1, \ldots P_n$.

STEP 0 (initialization of the procedure): for each posting list $P_i$ corresponding to a search term of the query (together, the "participating posting lists"), initialize the CURRENTDOC ($P_i$) pointer of that posting list to point to the first element of that posting list.

STEP 1: Set the DOCMAX variable to be equal to the highest one of each of the values returned by the various CURRENTDOC($P_i$) pointers for each the participating posting lists $P_i$. This will mean that DOCMAX will be equal to the highest document number returned by each of the three pointers in the illustrative example (i.e. MAX(CURRENTDOC($P_1$), CURRENTDOC($P_2$), CURRENTDOC($P_3$)). For example, were CURRENTDOC($P_1$) to return document number 1052, CURRENTDOC($P_2$) to return document number 5010, and CURRENTDOC($P_3$) to return document number 2033, then highest document number is 5010—that of CURRENTDOC($P_2$)—and DOCMAX would be equal to 5010.

STEP 2: Select one of the participating posting lists in which the DOCMAX value has not yet been reached; i.e. a list $P_i$ wherein the condition CURRENTDOC($P_i$)<DOCMAX is met, and go to STEP 3. If such a list does not exist (which means that for each participating posting list $P_i$, CURRENTDOC($P_i$) =DOCMAX—the document number DOCMAX appears in each of those posting lists and that document number is therefore one of the search results), then add the current DOCMAX to the result list R (at the end thereof) as a new entry, and go to Step 5.

STEP 3: Apply the function SKIP(DOCMAX, $P_i$) to the selected posting list, and go to Step 4. In the illustrative example, either $P_1$ or $P_3$ could have been selected in STEP 2. Assuming that $P_3$ were selected, apply the function SKIP(5010, $P_3$) to posting list $P_3$. Assuming for the purposes of illustration that that SKIP function returned the value 6234 (i.e. that document number 6234 was the first document in the posting list $P_3$ with a document number greater than document number 5010 (the then current DOCMAX value).

STEP 4: If the resulting value obtained from the function SKIP(DOCMAX, $P_i$) in STEP 3 (in the illustrative example—6234) is greater than the current DOCMAX value (in the illustrative example—5010), then set DOCMAX to this greater value, otherwise (i.e. if the resulting value of the function SKIP(DOCMAX, $P_i$) is exactly equal to the then current DOCMAX value) leave the value of DOCMAX as it is. In either case, go to STEP 7.

STEP 5 (Coming from STEP 2): If, after adding the new entry to the result list R, the pruning limit X has been reached, then terminate this search query execution procedure; otherwise go to STEP 6.

STEP 6: Select one of the participating posting lists $P_i$ (for example, the shortest one), and advance that pointer CURRENTDOC($P_i$) to the next position in that posting list. Set the value of DOCMAX to be equal to the value returned by the pointer CURRENTDOC($P_i$) after it has been moved to the next position in the list. Go to STEP 7.

STEP 7: If in either STEP 3 or STEP 6 (depending on how STEP 7 was reached) the end of the posting list being inspected was reached, then terminate this search query execution procedure; otherwise return to STEP 2. (In STEP 3 the end of the posting list will have been reached when the function SKIP(DOCMAX, $P_i$) when applied to the posting list $P_i$ returned a null result. In STEP 6, the end of the posting list will have been reached when there is no next position in the posting list to which the pointer CURRENTDOC($P_i$) may be advanced (the pointer will return a null result).

DETAILED DESCRIPTION—SOME EMBODIMENTS

Having understood the foregoing introductory concepts, embodiments of a search query execution procedure of the present technology will now be described.

Referring again to FIG. 1, in one embodiment, the coordinating server 40 of the search query execution subsystem 26 assigns to each new search query Q that query's weight. As was discussed hereinabove, the weight of the query is a characteristic of the query derived from statistical characteristics of its constituent search terms. The resulting weight of a search query reflects that query's complexity in terms of the number of elementary operations needed for its execution, or, equivalently, in terms of the time needed for that query's execution on a given configuration of shard replica servers 38 (with a given processor and memory speed, etc.), were the search query to be executed, i.e. by a single execution thread in each shard.

In one embodiment, one simplistic, though still effective, approximation is based on the assumption that the weight of a query should increase with the length of the posting lists corresponding to each of its constituent terms (as the longer the posting list, the more operations that would be needed to review each of that posting list's elements). Following this approach, the weight w(T) of a search term T (whether a word or otherwise) is defined as the logarithm (or other monotone function in other embodiments) of the length of that search term's corresponding posting lists (the length of the posting lists being the average length of the posting list corresponding to that search term in each of the shards). The "complexity" c(Q) of a multi-search term search query $Q=\{T_1, T_2, \ldots T_n\}$ is defined as the sum (or other monotone function in other embodiments) of the weights of all of that search query's constituent search terms $T_i$, thus:

$$c(Q)=w(T_1)+w(T_2)+ \ldots +w(T_n)$$

A more precise measure of the complexity of a multi-search term search query comprises one (or more) addend(s) that is/are a logarithm (or other monotone function in other embodiments) p(n) of the number of search terms in the search query. This is because a search query with more terms is inherently more complex as it requires more operations to be executed than another search query with the same total weight of all search terms but with a lesser number of terms. Hence, a more precise formula for the complexity of a multi-term search query (that could be used in other embodiments) is:

$$c(Q)=w(T_1)+w(T_2)+ \ldots +w(T_n)+p(n)$$

Alternatively, it can be assumed that the number of operations needed for executing a search query Q depends much more on the length of the shortest posting list of all of the posting lists corresponding to the search terms of the search query, than on the length of the longer posting lists. This is simply because the longer posting lists need not reviewed consecutively, but only need be reviewed in for the document numbers that are present in the shortest list (discussed in further detail herein below). Indeed this fact is already partly incorporated into the above formula by taking into account the logarithms of the lengths of the posting lists and not the value of the lengths themselves. Therefore, in other embodiments, other, more subtle formulas may be used such as the following one in which the sum of the weight terms is replaced:

$$c(Q)=n \cdot \text{MIN}(w(T_1)+w(T_2)+ \ldots +w(T_n))+p(n)$$

The above are examples in various embodiments of different variations of the search query complexity function c(Q). They are merely non-limiting illustrative examples that may occur in various embodiments. There is rarely a need, however, in the present context for an exact determination of the complexity of a search query. For present purposes all that is needed (in those embodiments where query weight is even being taken into account at all), is to establish a series of thresholds $h_1, h_2, \ldots$ for the values of c(Q), such that each search query $Q_1$ where $c(Q_1)<h_1$ is to be assigned a weight of 1 (i.e. $w(Q_1)=1$). Which, in the present embodiment, means that that search query will be executed using a single thread in each shard. Further, in the present embodiment, a query $Q_2$ where $h_1 \leq c(Q_2)<h_2$ is to be assigned a weight of two (i.e. $w(Q_2)=2$), meaning that that search query will be executed using 2 execution threads in each shard, and so on for query of higher weights.

In most embodiments, it is impractical to assign more than 4 parallel execution threads per shard to the same query as a higher number of parallel execution threads will not provide the expected gain in execution speed (as was discussed above). Thus, for most embodiments, all that is needed is a rough estimation of a search query's complexity to be able to assign it a weight of 1 or 2 (or 3, or 4—depending on the embodiment).

In some embodiments, the query complexity and query weight can be obtained with increasing precision over time by using, for example, an appropriate conventional machine learning method. In some embodiments, for a given combination of ranges of lengths of posting lists, a large number of simulated queries can be executed and the average actual query weight for that combination of posting list length ranges can be calculated. In this way, a large amount of source data will be generated, which can be processed by using an appropriately selected conventional machine learning method to obtain a formula for query weight estimation.

It should be emphasized in the context of the present specification that no particular definition or selection of any specific function or formula or calculation method for query weight estimation is required. The above are just a few illustrative examples of how such a function could be built or defined. In other embodiments, other methods can be used for rough estimation of search queries weight, depending on known characteristics of their constituent search terms.

To prepare the distributed phase of a query execution, which is performed independently in each shard in parallel, after the search query weight has been calculated, the coordinating server 40 dispatches each search query Q along with that query's associated query weight w(Q) to each shard's 50 group 48 of replica servers 38 (FIG. 1). It is therefore only a portion of the query Q (with respect to the whole search engine system 20) that is executed on each shard 50, however, for ease of presentation and understanding, that portion will still be referred to as a query hereinafter, and denoted by the same letter Q as the original full query. (The distributed query results from the various shards will be aggregated thereafter.) As was discussed hereinabove, conventionally within every shard's group 48 of replica servers, the query Q is taken up for execution by a single replica server 38. This single replica server limitation however, as will be more fully discussed hereinbelow, is no longer present in some embodiments of the present invention. For search queries having a query weight 2 or greater, the query can still be executed on a single replica server 38 of each group 48, or multiple replica servers 38 of the same group 48 in parallel—for example, to achieve better load balancing amongst the servers 38 of the group. The selection of which replica server(s) 38 of a group 48 that will be used for execution of a given query Q will be done from amongst those servers 38 of the group 48 that are not then currently being updated and hence are available for executing searches. This selection process may be done either centrally via the coordinating server 40, or locally in each group 48 of servers 38, for example in some embodiments, by a master server (not identified) of the group 48. No particular method of selection of which replica server(s) 38 of a group 48 of servers is required.

In some embodiments, the search system 20 comprises multiple servers 38 each having a multithreaded capability, be it either within the same processing core, on different cores, or both. Conventionally execution threads operating in parallel are used for executing different independent queries simultaneously. In embodiments of the present technology, however, some of the execution threads that are then available at the moment a search query having a weight greater than 1 is received for execution are assigned to the execution of that query in a parallel (be they on the same or different servers 38 of the group 48). For example, in some embodiments, having a query of weight 2 will use two execution threads (in each group 48 of replica servers 38 for a particular shard 50—be they on the same or different servers 38 of the group 48). Continuing with this same example, in some embodiments, a search query having a query weight 3 will use three execution threads (per shard 50); and so on and so forth. In some embodiments, the system may limit the number of threads to be used for the same query. In such cases, if, for example, this limit is 3, then every query of weight 3 or greater will be executed by 3 execution threads in parallel.

For ease of illustration and as an aid to understanding, in the subsequent description of an illustrative example, the case of a search query having a query weight of 2 will be presented in full detail. However, the present technology is not limited to search queries having query weights of 2. Generalization to search queries having greater query weights is straightforward for those of ordinary skill in the art.

Figure 3:
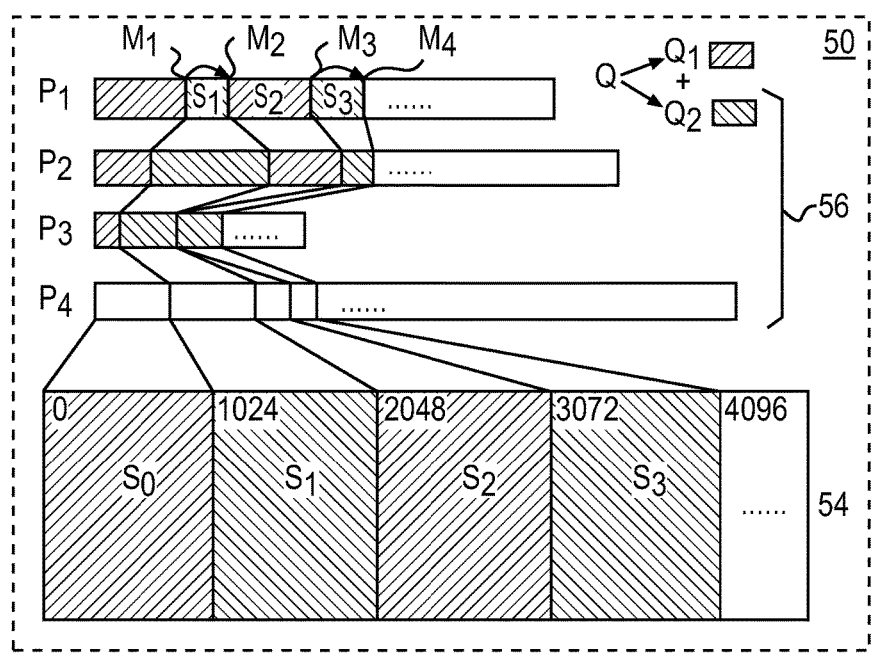
FIG. 3 is a schematic view similar to FIG. 2, providing additional detail over FIG. 2.

With reference to FIG. 3, a search query Q having a query weight 2 is received for execution with respect to a shard 50, by that shard's group 48 of replica servers 38 (FIG. 1). In this embodiment, that search query will be executed by two execution threads in parallel on the shard 50 as the search query has a weight of 2. The search query Q can thus be represented as the aggregation of two sub-queries, i.e. $Q_1+Q_2$ where "+" signifies that the results of sub-query $Q_1$ and the results of sub-query $Q_2$ are aggregated to form a complete list of results for the search query Q on that particular shard 50 (in this context "sub-queries" $Q_1$ and $Q_2$ have identical search terms, they are simply executed on different sets of segments of the shard 50).

Illustratively, the sample search query discussed hereinabove $Q=\{T_1, T_2, T_3\}$ having three search terms (e.g. words) will be again considered. Accordingly, out of the four posting lists $P_1$, $P_2$, $P_3$, and $P_4$ shown in both FIGS. 2 and 3, only the first three are involved in the execution of the search query Q as they correspond, respectively, to the search terms $T_1$, $T_2$, and $T_3$. The posting list $P_4$, as it does not correspond to any search term in search query Q, is not involved in the execution of search query Q. No other posting list for the shard 50 is involved in the execution of the search query Q either, for the same reason.

In the present embodiment, the entire collection of documents 54 (FIG. 3) of the shard 50 is notionally divided into a series of consecutive adjacent segments $S_0, S_1, S_2, \ldots$. In this embodiment each of the segments $S_i$ is of an equal size of 1024 documents (although their length will vary between 0 and 1024 among the various segments of the various individual posting lists, as discussed hereinabove). In this embodiment, two execution threads are assigned to carry out the search, with sub-queries $Q_1$ and $Q_2$ each being executed by a different thread. During the execution of each of these sub-queries $Q_1$ and $Q_2$, each thread will be assigned to review one of two complementary sets of corresponding interspaced segments of each of the plurality of posting lists corresponding to the plurality of search terms. The first of such sets consists of the even-numbered segments of each posting list $\{S_0|P_1, S_0|P_2, S_0|P_3, S_2|P_1, S_2|P_2, S_2|P_3, \ldots\}$. This first set will be explored by sub-query $Q_1$. The second set consists of the odd-numbered segments of each posting list $\{S_1|P_1, S_1|P_2, S_1|P_3, S_3|P_1, S_3|P_2, S_3|P_3, \ldots\}$ This second set will be explored by sub-query $Q_2$.

For ease of understanding, it may be thought of that each of the execution threads will review the segments that it is "authorized" to review (its "authorized segments") and that each execution thread will not review the segments that it is not authorized to review (its "forbidden" segments). Thus, in this embodiment, the first execution thread processing sub-query $Q_1$ will have as its authorized segments the even-numbered segments $(S_{2i})$ of each the posting lists $P_1$, $P_2$, $P_3$ and will have as its forbidden segments the odd-numbered segments $(S_{2i})$ of each of those posting lists. Conversely, in this embodiment, the second execution thread processing sub-query $Q_2$ will have as its forbidden segments the even-numbered segments $(S_{2i})$ of each the posting lists $P_1$, $P_2$, $P_3$ and will have as its authorized segments the odd-numbered segments $(S_{2i+1})$ of each of those posting lists. Hence, both execution threads will progress in parallel through the whole of the posting lists, up to some (results) limit that depends on the pruning condition.

As can be seen in FIG. 3, although the segments $S_0$, $S_1$, $S_2, \ldots$ of each of the posting lists $P_1$, $P_2$, $P_3$ are of the same size, although in this embodiment they are not of the same length (either within one particular posting list, or comparing similar segments between posting lists). Indeed, in this embodiment segment $S_2$ of posting list $P_3$ has a segment length of 0—that segment is empty, it contains no references to any document.

Segment $S_2$ of posting list $P_1$ consists of references to those documents having a document number of between 2048 to 3071 (inclusive) in which search term $P_1$ occurs at least one. Hence, the first item (i.e. the first document reference) in this segment $S_2$ is a reference to a document having a document number greater than or equal to 2048 (although not necessarily being to document number 2048). Similarly, the last item (i.e. the last document reference) in this segment $S_2$ is a reference to a document having a document number less than or equal to 3071 (although not necessarily being document number 3071).

In this embodiment, sub-query $Q_1$ will review its authorized segments $S_0, S_2, \ldots$ in each of the relevant posting lists, while not reviewing (i.e. skipping) its forbidden segments $S_1, S_3, \ldots$. Similarly, sub-query $Q_2$ will review its authorized segments $S_1, S_3, \ldots$ in each of the relevant posting lists, while not reviewing (i.e. skipping) its forbidden segments $S_0, S_2, \ldots$ (the even-numbered segments). In FIG. 3, this is shown by having the various segments to be reviewed by sub-query $Q_1$ cross-hatched differently from those segments to be reviewed by sub-query $Q_2$, and also by arrows indicating the skipping of segments $S_1$ and $S_3$ in posting list $P_1$ by the sub-query $Q_1$.

A procedure similar to the aforementioned conventional search procedure can be written, taking into account the present technology. It will be understood that in this procedure, it must be ensured that execution threads only perform the search on their authorized segments and therefore skip over their forbidden segments. The procedure that follows is a non-limitative illustrative example of such a procedure.

STEP 0 (initialization of the procedure): for each posting list $P_i$ corresponding to search term (collectively, the "participating posting lists"), initialize the CURRENTDOC($P_i$) pointer of that posting list to point to the first element of the first authorized segment of that posting list.

STEP 1: Set the DOCMAX variable to be equal to the highest one of each of the values returned by the various CURRENTDOC($P_i$) pointers for each the participating posting lists $P_i$. This will mean that DOCMAX will be equal to the highest document number returned by each of the three pointers in the illustrative example (i.e. MAX(CURRENTDOC($P_1$), CURRENTDOC($P_2$), CURRENTDOC($P_3$)).

STEP 2: Select one of the participating posting lists in which the DOCMAX value has not yet been reached; i.e. a list $P_i$ wherein the condition CURRENTDOC($P_i$)<DOCMAX is met, and go to STEP 3. If such a list does not exist (which means that for each participating posting list $P_i$, CURRENTDOC($P_i$)=DOCMAX—the document number DOCMAX appears in each of those posting lists and that document number is therefore one of the search results), then add the current DOCMAX to the result list R (at the end thereof) as a new entry, and go to STEP 7.

STEP 3: Apply the function SKIP(DOCMAX, $P_i$) to the selected posting list, and go to STEP 4.

STEP 4: If the resulting value obtained from the function SKIP(DOCMAX, $P_i$) in STEP 3 falls within some authorized segment $S_j$ then go to STEP 6. If resulting value obtained from the function SKIP(DOCMAX, $P_i$) result falls within a forbidden segment $S_j$ then go to STEP 5.

STEP 5: Advance the pointer CURRENTDOC($P_i$) to the position of the first element of the first non-empty authorized segment subsequent to that forbidden segment $S_j$ in the posting list $P_i$ currently being reviewed. Set the value of DOCMAX to be equal to the value returned by the pointer CURRENTDOC($P_i$) after it has been advanced. Go to STEP 11.

STEP 6: If the resulting value obtained from the function SKIP(DOCMAX, $P_i$) in STEP 3 is greater than the current DOCMAX value, then set DOCMAX to this greater value, otherwise (i.e. if the resulting value of the function SKIP(DOCMAX, $P_i$) is exactly equal to the then current DOCMAX value) leave the value of DOCMAX as it is. In either case, go to STEP 11.

STEP 7 (Coming from STEP 2): If, after adding the new entry to the result list R, the pruning limit X has been reached, then terminate this search query execution procedure; otherwise go to STEP 8.

STEP 8: Select one of the participating posting lists $P_i$ (for example, the shortest one), and advance that pointer CURRENTDOC($P_i$) to the next position in that posting list. Continue to STEP 9.

STEP 9: If the value returned by the pointer CURRENTDOC ($P_i$) after it has been advanced in STEP 8 falls within some authorized segment $S_j$, then set the value of DOCMAX to be equal to the value returned by the pointer CURRENTDOC($P_i$) after having been advanced in STEP 8; go to STEP 11. If the value returned by the pointer CURRENTDOC($P_i$) after it has been advanced in STEP 8 falls within some forbidden segment $S_j$ go to STEP 10.

STEP 10: Advance the pointer CURRENTDOC($P_i$) to the position of the first element of the first non-empty authorized segment subsequent to that forbidden segment $S_j$ in the posting list $P_i$ currently being reviewed. Set the value of DOCMAX to be equal to the value returned by the pointer CURRENTDOC($P_i$) after it has been advanced. Go to STEP 11.

STEP 11: If in either STEP 3, STEP 5, STEP 8 or STEP 10 (depending on how STEP 11 was reached) the end of the posting list being inspected was reached, then terminate this search query execution procedure; otherwise return to STEP 2. (In STEP 3 the end of the posting list will have been reached when the function SKIP(DOCMAX, $P_i$) when applied to the posting list $P_i$ returned a null result. In STEP 8, the end of the posting list will have been reached when there is no next position in the posting list to which the pointer CURRENTDOC($P_i$) may be advanced (the pointer will return a null result). In STEP 5 or STEP 10, the end of the posting list will have been reached when there is no non-empty authorized segment subsequent to the forbidden segment in the posting list then currently being examined (the pointer will return a null result).

Again, it should be understood that the procedure set forth above is simply an illustrative embodiment of the present technology. It is not intended to define or limit the scope of the present technology.

In an alternative embodiment, a procedure may use, for every posting list, a sub-index consisting of markers $M_1, M_2, \ldots$ to the first positions of the segments $S_1, S_2, \ldots$ of the posting lists (see FIG. 3). Such a sub-index can be implemented as a separate array of absolute pointers to the first elements of every segment in a posting list, or as a chained list of segment headers within the posting list, or in many other ways. In some embodiments, in the course of execution of a search query, when the end of the then current authorized segment is reached, the procedure will use the sub-index to skip the subsequent forbidden segment and find the first element of the next authorized segment. This will be done for every posting list participating in the query execution, with each posting list having its own sub-index.

It follows from the above description that in some embodiments the threads executing the two sub-queries $Q_1$ and $Q_2$ can be executed completely independently of one another on the same or different replica servers 38 of a group 48 of replica servers for a given shard 50. For each participating posting list, each thread will review its one of the complementary sets of corresponding interspaced segments of each of the plurality of posting lists corresponding to the plurality of search terms. In the embodiment described, the thread executing search sub-query $Q_1$ will review the even-numbered segments of the posting lists, the thread executing sub-query $Q_2$ will review the odd-numbered segments of the posting lists. As the two sets of segments in each participating posting list complement with each other in this embodiment and are of the same size, it follows that the documents in each of the sets of segments not only follow the same order of decreasing overall relevance, but are near-evenly distributed between the two sets. Thus, for example, the execution of search sub-query $Q_1$ may have located documents with document number 55 (in segment $S_0$), 2057 (in segment $S_2$), 2370 (in segment $S_2$), and so on. While the execution of search sub-query $Q_2$ may have located documents with document number 1205 (in segment $S_1$) and 1890 (in segment $S_1$), and so on. The average distribution of relevance in the results obtained via sub-query $Q_1$ and sub-query $Q_2$ would be comparable, with the most relevant documents being found in some cases via the execution of sub-query $Q_1$, and in other cases via the execution of sub-query $Q_2$. (For example, this would be the case where $S_0$ contains no relevant documents, while $S_1$ does contain some). This may also help towards equalizing the execution times of sub-query $Q_1$ and sub-query $Q_2$.

In some embodiments, the above consideration is very important for defining the stop condition ("pruning limit") for each of the sub-queries $Q_1$ and $Q_2$. In fact, if the search system 20 is configured to deliver not more than Z most relevant search results ("hits") for any given search query (Z would thus be the "global pruning limit"), then a search of each of the N shards should provide slightly more than Z/N hits, for example, in one embodiment 1.1 (Z/N) hits (1.1 (Z/N) would thus be the "local pruning limit"). The local pruning limit would then be divided, in the embodiment under consideration, between the two sub-queries $Q_1$ and $Q_2$. In this embodiment, it would be reasonable to define the divided local pruning limit as a number of hits slightly over ½ of the local pruning limit, 0.55 of the local pruning limit. The divided local pruning limit in this embodiment would this by 0.605 (Z/N) Therefore, proceeding in this manner, the hits in excess of the global pruning limit (which would be the least relevant ones that would be discarded after aggregating the partial search results), would not be too numerous, and the time having been used to locate those pruned excess hits (sometimes referred to as "the overhead")) would be immaterial.

In other embodiments, other types of pruning conditions can also be easily implemented, without introducing significant overhead by returning too many hits in excess of the global pruning limit. For example, if the pruning condition is specified in terms of minimum acceptable relevance, then this criterion could be applied without modification during the execution of sub-queries $Q_1$ and $Q_2$. If the pruning criterion comprises both a maximum total number of hits and a minimum relevance of every hit, then the minimum relevance will be defined the same way in both sub-queries, while the maximum number of results in every sub-query will be some percentage of the total maximum number of results, as discussed above. Similar considerations can be applied if the pruning condition is specified in terms of the diversity of the results. In some embodiments, the entire document base is divided amongst the various sub-queries in a homogenous and "fair" way, so that the sets of results obtained by the execution of each sub-query are statistically equivalent in terms of any pruning condition.

In one embodiment, the aggregation of results produced by the execution of the two sub-queries $Q_1$ and $Q_2$ into one common list of results for the original query Q can be carried out via the same server 38 where the sub-queries were executed. Alternatively, in other embodiments, both result lists can be separately sent back to the coordinating server 40 of the search query execution subsystem 26 where a global aggregation procedure can be performed in order to obtain one final relevance-ordered list of results. In yet another embodiment, the coordinating server 40 can split the original query Q into two sub-queries $Q_1$ and $Q_2$, send them to each and every shard as two independent queries, each accompanied by additional parameters, for example, specifying the set of authorized segments and the partial pruning limit.

While the present technology has been described herein in full detail for the case of a search query Q having a query weight 2 (dividing the search query into 2 independent sub-queries to be executed by 2 processing threads), it will be readily understood that a similar method can be applied to the same unmodified data for performing queries Q of any weight w(Q) by the same number w(Q) of processing threads (limited only by the total number of threads available in a group 48 of shard replica servers). For example, in one embodiment, to execute a search query Q of weight 3 via 3 processing threads in parallel, 3 sub-queries $Q_1$, $Q_2$ and $Q_3$ will be defined, and for each posting list $P_i$ participating in the search, the entirety of its segments $S_0$, $S_1$, $S_2$, $S_3$, ... will be divided into three sets, and not just into two (even and odd) as was described above for queries of weight 2. For example: Segments $S_{3k}$, k=0, 1, ... will be reviewed by the thread executing search sub-query $Q_1$. Segments $S_{3k+1}$, k=0, 1, ... will be reviewed by the thread executing search sub-query $Q_2$. Segments $S_{3k+2}$, k=0, 1, ... will be reviewed by the thread executing search sub-query $Q_3$.

In some embodiments, no preparatory actions prior to the commencement of the search are needed, and the entire inverted index of every shard is readily available for parallel execution of a mix of search queries of different query weights. For example, 8 threads of the same replica server 38 can execute simultaneously 3 queries of weight 1, one query of weight 2 and one query of weight 3 (1+1+1+2+3=8), or other combination of queries. Moreover, in some embodiments distribution of threads among multiple queries of different weights can be programmed centrally in the coordinating server 40. In this manner, the distribution will be the same in every shard.

Furthermore, in some embodiments, sub-queries of the same query may be assigned for execution to threads of different replica servers 38 in the group of replica servers 48 for the same shard 50. For example, if there are 3 replicas on three replica servers 38 available for searching for a given shard 50, with 8 processing threads per replica server 38, then the coordinating server 40 of the search query execution subsystem 26 may split 8 search queries into 3 sub-queries each, and assign the 3 sub-queries of each query to 3 processing threads in different replica servers 38, one per replica server 38. In this way, the first replica server 38 will execute all the first sub-queries of each of those 8 queries, the second replica server 38 will execute the second sub-queries of each of those 8 queries, and the third replica server will execute the third sub-queries of each of those 8 queries. If however all 3 processing threads of each query had to be assigned to the same replica server 38, then only 2 queries per server could be executed, for a total of 6 queries, while the other 2 queries would be placed in a waiting list, or executed with a lesser number of threads, hence would be executed with a greater delay.

In another embodiment, a search query may be executed via 3 processing threads in the same system as described in the previous paragraph (a group 48 of three replica servers 38, each having 8 processing threads total), but where the first replica server 38 has just one thread available, and the second replica server 38 has only two threads available. In this case, the 3 threads of the new search query can be distributed amongst the first server (1 thread) and the second server (2 threads) and executed immediately, rather than waiting for more threads to become available. These are just a few examples of a multitude of possible query distribution cases the present technology allows for.

In another embodiment the collection of documents 54 is divided into segments of different sizes. In one such embodiment, the first 10 segments have a size of 1024 ("1K") documents and thus $S_0$ contains documents with document numbers 0 to 1023, $S_1$ contains documents 1024 to 2047, $S_2$ contain documents with document numbers 2048 to 3071, and so forth. The second ten segments have a size of 2048 ("2K") documents and thus $S_{10}$ contains documents with document numbers 10240 to 12287, and so forth. The third ten segments have a size of 5120 ("5K") documents and thus $S_{20}$ contains documents with document numbers 30720 to 35839, and so forth. The segments continue increasing in size in the same fashion until the end of the posting list. Variable-size segmenting may be useful in some embodiments because higher the document number in most of the embodiments that have been described hereinabove, the lower is the query-independent relevance of the document. Hence, in most of such embodiments, there will be little or no negative effects of the execution of one of the sub-queries stopping (having reached its particular pruning limit) many thousands of documents before those of the other sub-queries stop.

Finally, it should be noted that, while the above-described procedure of multi-threaded execution of a query deals specifically with AND-type queries, other logical conditions on search terms can be handled as well, by appropriately modified procedures equally benefiting from the inventive method. Take for example a query "$T_1$ and $T_2$ and $T_3$ and not $T_4$". The corresponding two-threaded procedure will explore in each thread the same sequence of "authorized segments" in the posting lists $P_1$ to $P_4$, resp. for search terms $T_1$ to $T_4$, while skipping the same "forbidden segments"; and within every authorized segment, the same progression of the DOCMAX pointer (see above) will be operated in $P_1$, $P_2$ and $P_3$, while $P_4$ will be used at the last place, to check a reference for its inclusion in R on a condition that $T_4$ does not occur in the referenced document.

A slightly more important modification of the above procedure will be needed if search results are selected according to the already mentioned heuristic quorum principle. In this case, not only the step of considering a referenced document for its inclusion in the result list (step 2 of the above procedure) should be reformulated, but also the steps of advancing the current DOCMAX pointer to a next position should be modified, based on some heuristic considerations, in order as not to skip over any document on which the quorum condition is attained. Details of this procedure are known to those skilled in the art, and are not the object of the present invention. A person skilled in the art will appreciate the fact that the same steps of skipping forbidden segments when progressing through posting lists can be added to a quorum-based search procedure in the same way as described above for the simple deterministic search procedure. Hence the inventive method of search query acceleration can be equally well applied to a search using the quorum principle.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A computer-implemented method of searching an inverted index having a plurality of posting lists, the method comprising:
   receiving, via at least one server, a search query to be searched, the search query including a plurality of search terms;
   calculating, via at least one computer processor, a weight of the search query;
   determining, via the at least one computer processor, a number of sub-queries to search based on the weight of the search query, each respective sub-query having the plurality of search terms of the search query, each respective sub-query to be searched by a respective separate execution thread of the at least one computer processor;
   determining, via the at least one computer processor, for each respective search term of the plurality of search terms, a respective posting list of the plurality of posting lists to search, each respective posting list of the plurality of posting lists being divided into a plurality of segments;
   determining, via the at least one computer processor, for each respective sub-query, a respective set of authorized segments of the plurality of segments to search by the respective separate execution thread and a respective set of forbidden segments of the plurality of segments not to search by the respective separate execution thread in each respective posting list;
   the respective set of authorized segments being, for each respective sub-query, one of a plurality of complementary sets of corresponding interspaced segments; and
   a combination of the plurality of complementary sets of corresponding interspaced segments forming the respective posting lists to search in the plurality of posting lists;
   multithreadedly searching the plurality of complementary sets of corresponding interspaced segments, by each of the respective separate execution threads via the at least one computer processor, by searching each respective term of the plurality of terms in the respective posting list of the plurality of posting lists, each respective separate execution thread searching the respective term of the plurality of terms in the respective set of authorized segments of the respective posting list and not searching the respective forbidden set of segments of the respective posting list to yield per-thread search results;
   aggregating, via the at least one computer processor, the per-thread search results, to yield aggregated search results; and
   transmitting, via the at least one server, at least a portion of the aggregated search results.

2. The computer-implemented method of claim 1, wherein only if the weight of the search query exceeds a threshold weight value are the plurality of complementary sets of corresponding interspaced segments multithreadedly searched by the respective separate execution threads to yield per-thread search results.

3. The computer-implemented method of claim 2, wherein the weight of the search query is a function of a length of the plurality of posting lists corresponding to the plurality of search terms.

4. The computer-implemented method of claim 1, wherein a number of sets in the plurality of complementary sets of corresponding interspaced segments of each respective posting list of the plurality of posting lists corresponding to the respective search term of the plurality of search terms is a function of the weight of the query.

5. The computer-implemented method of claim 1, wherein a number of sets in the plurality of complementary sets of corresponding interspaced segments of each respective posting list of the plurality of posting lists corresponding to the respective search term of the plurality of search terms is a function of a number of separate threads.

6. The computer-implemented method of claim 4, wherein the number of sets in the plurality of complementary sets of corresponding interspaced segments of each respective posting list of the plurality of posting lists corresponding to the respective search term of the plurality of search terms is not greater than a number of sets limit value.

7. The computer-implemented method of claim 1, wherein each respective posting list of the plurality of posting lists corresponding to the respective search term of the plurality of search terms references a plurality of indexed items, the indexed items being sequentially numbered.

8. The computer-implemented method of claim 1, wherein each respective posting list of the plurality of posting lists corresponding to the respective search term of the plurality of search terms is a differential posting list.

9. The computer-implemented method of claim 1, wherein each respective posting list of the plurality of posting lists corresponding to the respective search term of the plurality of search terms references a plurality of indexed items, the indexed items being ordered in an order of decreasing query-independent relevance.

10. The computer-implemented method of claim 1, wherein segments in each of the plurality of complementary sets of corresponding interspaced segments of each respective posting list of the plurality of posting lists corresponding the respective search term of to the plurality of search terms do not overlap with adjacent segments in others of the plurality of complementary sets of corresponding interspaced segments of each respective posting list of the plurality of posting lists corresponding to the respective search term of the plurality of search terms.

11. The computer-implemented method of claim 1, wherein at least one segment in each of the plurality of complementary sets of corresponding interspaced segments of each respective posting list of the plurality of posting lists corresponding to the respective search term of the plurality of search terms overlaps with at least one adjacent segment in others of the plurality of complementary sets of corresponding interspaced segments of each respective posting list of the plurality of posting lists corresponding to the respective search term of the plurality of search terms.

12. The computer-implemented method of claim 1, wherein each respective posting list of the plurality of posting lists corresponding to the respective search term of the plurality of search terms includes a plurality of markers segmenting that posting list, the pluralities of markers being coordinated across the plurality of posting lists corresponding to the plurality of search terms such that each respective posting list of the plurality of posting lists corresponding to the respective search term of the plurality of search terms is similarly segmented with respect to the others of the plurality of posting lists corresponding to the plurality of search terms.

13. The computer-implemented method of claim 12, wherein spacing between at least some of the markers segmenting at least one posting list of the plurality of posting lists corresponding to the plurality of search terms varies.

14. The computer-implemented method of claim 12, wherein spacing between at least some of the markers segmenting at least one posting list of the plurality of posting lists corresponding to the respective search term of the plurality of search terms increases.

15. The computer-implemented method of claim 1, wherein the segments of each of the plurality of complementary sets of corresponding interspaced segments of each respective posting list of the plurality of posting lists corresponding to the respective search term of the plurality of search terms are of a fixed size.

16. The computer-implemented method of claim 15, wherein the segments of each of the plurality of complementary sets of corresponding interspaced segments of each respective posting list of the plurality of posting lists corresponding to the respective search term of the plurality of search terms are of a same fixed size.

17. The computer-implemented method of claim 15, wherein the segments of each of the plurality of complementary sets of corresponding interspaced segments of each respective posting list of the plurality of posting lists corresponding to the respective search term of the plurality of search terms are of a variable fixed size.

18. The computer-implemented method of claim 15, wherein the segments of each of the plurality of complementary sets of corresponding interspaced segments of each respective posting list of the plurality of posting lists corresponding to the respective search term of the plurality of search terms are of an increasing fixed size.

19. The computer-implemented method of claim 1, wherein at least some of the segments within at least one set of the plurality of complementary sets of corresponding interspaced segments of each respective posting list of the plurality of posting lists corresponding to the respective search term of the plurality of search terms vary in length.

20. The computer-implemented method of claim 1, wherein at least one of the segments within at least one set of the plurality of complementary sets of corresponding interspaced segments of each respective posting list of the plurality of posting lists corresponding to the respective search term of the plurality of search terms has a length of zero.

21. The computer-implemented method of claim 1, wherein corresponding segments of the plurality of complementary sets of corresponding interspaced segments of each respective posting list of the plurality of posting lists corresponding to the respective search term of the plurality of search terms, as between different sets of the plurality of complementary sets of corresponding interspaced segments of each respective posting list of the plurality of posting lists corresponding to the respective search term of the plurality of search terms, differ in length.

22. The computer-implemented method of claim 1, wherein multithreadedly searching, via at least one computer processor, the plurality of complementary sets of corresponding interspaced segments of each respective posting list of the plurality of posting lists corresponding to the respective search term of the plurality of search terms, includes at least one segment of at least one of the sets of corresponding interspaced segments of each respective posting list of the plurality of posting lists corresponding to the respective search term of the search terms being skipped.

23. The computer-implemented method of claim 1, wherein, multithreadedly searching, via at least one computer processor, the plurality of complementary sets of corresponding interspaced segments of each respective posting list of the plurality of posting lists corresponding to the respective search term of the plurality of search terms, includes at least two of the respective execution threads being executed by the at least one computer processor at least partially in parallel.

* * * * *